United States Patent
Oh (10) Patent No.: US 10,704,483 B2
(45) Date of Patent: Jul. 7, 2020

(54) BLENDED FUEL INJECTION CONTROL METHOD FOR VEHICLES

(71) Applicants: Hyundai Motor Company, Seoul (KR); Kia Motors Corporation, Seoul (KR)

(72) Inventor: Young Kyu Oh, Gwacheon-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 58 days.

(21) Appl. No.: 16/182,375

(22) Filed: Nov. 6, 2018

(65) Prior Publication Data

US 2019/0277213 A1  Sep. 12, 2019

(30) Foreign Application Priority Data

Mar. 6, 2018  (KR) .................. 10-2018-0026115

(51) Int. Cl.
*F02D 41/06*  (2006.01)
*F02D 41/32*  (2006.01)
(Continued)

(52) U.S. Cl.
CPC ......... *F02D 41/064* (2013.01); *F02D 19/084* (2013.01); *F02D 19/087* (2013.01);
(Continued)

(58) Field of Classification Search
CPC ........ F02D 19/06; F02D 19/064; F02D 41/00; F02D 41/0025; F02D 41/08;
(Continued)

(56) References Cited

U.S. PATENT DOCUMENTS

2007/0023012 A1* 2/2007 Maemura .............. F02D 41/064
                                                                 123/500
2007/0119425 A1* 5/2007 Lewis ................. F02D 19/0692
                                                                 123/478
(Continued)

FOREIGN PATENT DOCUMENTS

JP  2008-223676 A  9/2008
JP  2008-255907 A  10/2008
(Continued)

*Primary Examiner* — John Kwon
*Assistant Examiner* — Johnny H Hoang
(74) *Attorney, Agent, or Firm* — Morgan, Lewis & Bockius LLP (57) ABSTRACT

A blended fuel injection control method may include a cold-starting determination step in which a controller determines whether a cold-starting condition is satisfied on the basis of output values that can be obtained by a vehicle; a detection step in which the controller detects the content of ethanol in blended fuel of gasoline and ethanol when determining the cold-starting condition is satisfied; and a first injection control step in which the controller controls the blended fuel to be injected selectively in one of a Multi-Point Injection (MPI) mode, an MPI & GDI mode combining MPI and Gasoline Direct Injection (GDI) modes, and a GDI mode in accordance with the content of ethanol in the blended fuel until an engine RPM reaches an early peak RPM in engine-cranking.

13 Claims, 10 Drawing Sheets

(51) Int. Cl.
*F02D 41/38* (2006.01)
*F02D 41/00* (2006.01)
*F02D 41/40* (2006.01)
*F02D 41/30* (2006.01)
*F02D 19/08* (2006.01)

(52) U.S. Cl.
CPC ..... *F02D 41/0025* (2013.01); *F02D 41/3094* (2013.01); *F02D 41/32* (2013.01); *F02D 41/38* (2013.01); *F02D 41/402* (2013.01); *F02D 2200/0611* (2013.01); *F02D 2200/101* (2013.01); *F02D 2200/1002* (2013.01)

(58) Field of Classification Search
CPC ...... F02D 41/084; F02D 41/087; F02D 41/30; F02D 41/3094; F02D 41/32; F02D 41/38; F02D 41/40
USPC .......... 701/101–105, 111–115; 123/478–481, 123/27 GE, 525–527, 575–577
See application file for complete search history.

(56) References Cited

U.S. PATENT DOCUMENTS

| | | | | |
|---|---|---|---|---|
| 2010/0191478 | A1* | 7/2010 | Emery | F02D 35/023 702/24 |
| 2014/0182554 | A1* | 7/2014 | Lee | F02M 53/06 123/470 |
| 2016/0341145 | A1* | 11/2016 | Yasuda | F02D 41/0025 |
| 2018/0266351 | A1* | 9/2018 | Coulson | F02D 41/401 |

FOREIGN PATENT DOCUMENTS

| | | |
|---|---|---|
| JP | 2008-261231 A | 10/2008 |
| JP | 2009-236073 A | 10/2009 |
| JP | 2017-172404 A | 9/2017 |
| KR | 10-2012-0127918 A | 11/2012 |
| KR | 10-1305611 B1 | 9/2013 |
| KR | 10-2016-0072899 A | 6/2016 |

* cited by examiner

BLENDED FUEL INJECTION CONTROL METHOD FOR VEHICLES

CROSS REFERENCE TO RELATED APPLICATION

The present application claims priority to Korean Patent Application No. 10-2018-0026115, filed Mar. 6, 2018, the entire contents of which is incorporated herein for all purposes by this reference.

BACKGROUND OF THE INVENTION

Field of the Invention

The present invention relates to a blended fuel injection control method for a vehicle, the method improving the ability to start an engine and minimize exhaust emission by changing injection modes in accordance with the content of ethanol in blended fuel.

Description of Related Art

Recently, interest in bio fuel is increasing due to a rise in oil price and regulation on exhaust of greenhouse gas, so bioethanol has been increasingly popularized as substitute fuel for transportation to diversify energy sources, deal with The United Nations Framework Convention on Climate Change, and develop agriculture.

A bioethanol Flexible Fuel Vehicle (FFV) that can use high-density bioethanol has been increasingly popularized to increase the demand for bioethanol and the number of E85 FFVs using 86% of ethanol has been increased.

That is, using bioethanol reduces the unit cost of production and decreases a large amount of $CO_2$ (which is 40% of $CO_2$ produced by gasoline), so bioethanol is increasingly used.

The ratio of an FFV is about 75% and is continuously increasing in South American countries such as Brazil.

However, the vapor pressure of ethanol is low (40 kpa or less), as compared with the vapor pressure (55~70 kpa) of gasoline, so using fuel of 100% ethanol causes a problem with starting an engine in a winter season or areas with low temperature of external air.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing blended fuel injection control method that can improve the ability to start an engine at a low temperature and minimize exhaust emission by appropriately changing the injection mode in accordance with the content of ethanol in blended fuel.

A blended fuel injection control method according to various aspects of the present invention may include: a cold-starting determination step in which a controller is configured to determine whether a cold-starting condition is satisfied on the basis of output values which may be obtained by a vehicle; a detection step in which the controller detects the content of ethanol in blended fuel of gasoline and ethanol when determining the cold-starting condition is satisfied; and a first injection control step in which the controller controls the blended fuel to be injected selectively in one of a Multi-Point Injection (MPI) mode, an MPI & GDI mode combining MPI and Gasoline Direct Injection (GDI) modes, and a GDI mode in accordance with the content of ethanol in the blended fuel until an engine RPM reaches an early peak RPM in engine-cranking.

The first injection control step may inject the blended fuel in the MPI mode when the content of ethanol is less than a first reference content, inject the blended fuel in the MPI & GDI mode when the content of ethanol is the first reference content or more and less than a second reference content, and inject the blended fuel in the GDI mode when the content of ethanol is the second reference content or more.

The method may further include a second injection control step that controls the blended fuel to be injected selectively in one of the MPI mode, the MPI & GDI mode, and the GDI mode in accordance with load periods, which are determined by a relationship between an engine RPM and engine torque, after the first injection control step.

When the content of ethanol is less than the first reference content, the second injection control method may inject the blended fuel in the MPI mode in a low-load period, inject the blended fuel in the MPI & and GDI mode in a medium-load period, and inject the blended fuel in the GDI mode in a high-load period.

When the content of ethanol is the first reference content or more and less than the second reference content, the second injection control method may inject the blended fuel in the MPI & GDI mode in a low-load period and inject the blended fuel in the GDI mode in a medium-load period and a high-load period.

In the second injection control step, when the content of ethanol is the first reference content or more and less than the second reference content, GDI in the low-load period and the medium-load period may perform one-step injection and GDI in the high-load period may perform two-step injection.

In the second injection control step, when the content of ethanol is the second reference content or more, the blended fuel may be injected in the GDI mode in the low-load period, the medium-load period, and the high-load period.

In the second injection control step, when the content of ethanol is the second reference content or more and less than a third reference content, GDI in the low-load period may performs one-step injection and GDI in the medium-load period and the high-load period may perform two-step injection.

In the second injection control step, when the content of ethanol is the third reference content or more but less than 100%, the GDI in the low-load period may perform two-step injection and the GDI in the medium-load period and the high-load period may perform three-step injection.

In the second injection control step, when the content of ethanol is 100%, the GDI in the low-load period, the medium-load period, and the high-load period may perform three-step injection.

In the MPI and GDI mode, a ratio of a fuel injection amount according to MPI and a fuel injection amount according to GDI may be determined in accordance with the load periods that are determined by the relationship between the engine RPM and the engine torque.

In the MPI, a fuel injection time may be advanced or retarded a predetermined angle from a top dead center of a piston in an early stage of an intake stroke, in accordance with the load periods that are determined by the relationship between the engine RPM and the engine torque.

In one-step injection of the GDI mode, fuel may be injected during a predetermined angle within a range of 90° in a retarded direction from a top dead center of a piston in an intake stroke; in two-step injection of the GDI mode, first injection may inject fuel for a predetermined angle within a range of 90° in the retarded direction from the top dead center of the piston in the intake stroke and second injection may inject fuel during a predetermined angle from a middle point between a bottom dead center and a top dead center of the piston in a compression stroke; and in three-step injection of the GDI mode, first injection and second injection may intermittently inject fuel during a predetermined angle within a range of 100° in the retarded direction from the top dead center of the piston in the intake stroke, and third injection may inject fuel during a predetermined angle at the middle point between the bottom dead center and the top dead center of the piston in the compression stroke.

According to an exemplary embodiment of the present invention, it is possible to improves the ability to start an engine and minimize exhaust emission by appropriately changing the ratio of MPI and GDI in accordance with the content of ethanol in cold-starting and by appropriately changing the ratio of MPI and GDI to inject fuel in accordance with the content of ethanol and the load of a vehicle even while the vehicle is driven after cold-starting.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Exemplary embodiments of the present invention are described hereafter in detail with reference to the accompanying drawings.

Figure 1A:
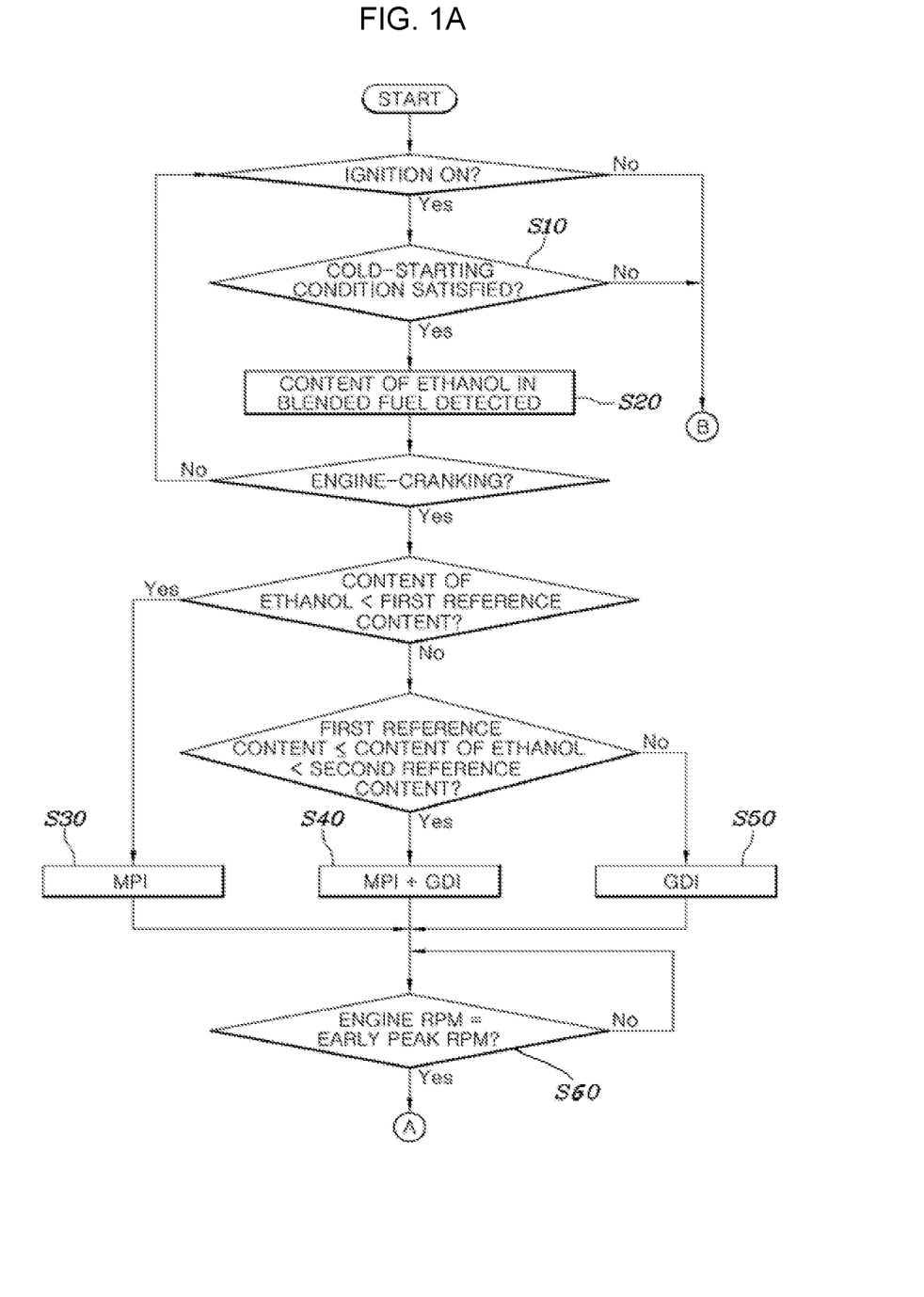
FIG. 1A and FIG. 1B are flowcharts sequentially showing a blended fuel injection control process according to an exemplary embodiment of the present invention.
Figure 1B:
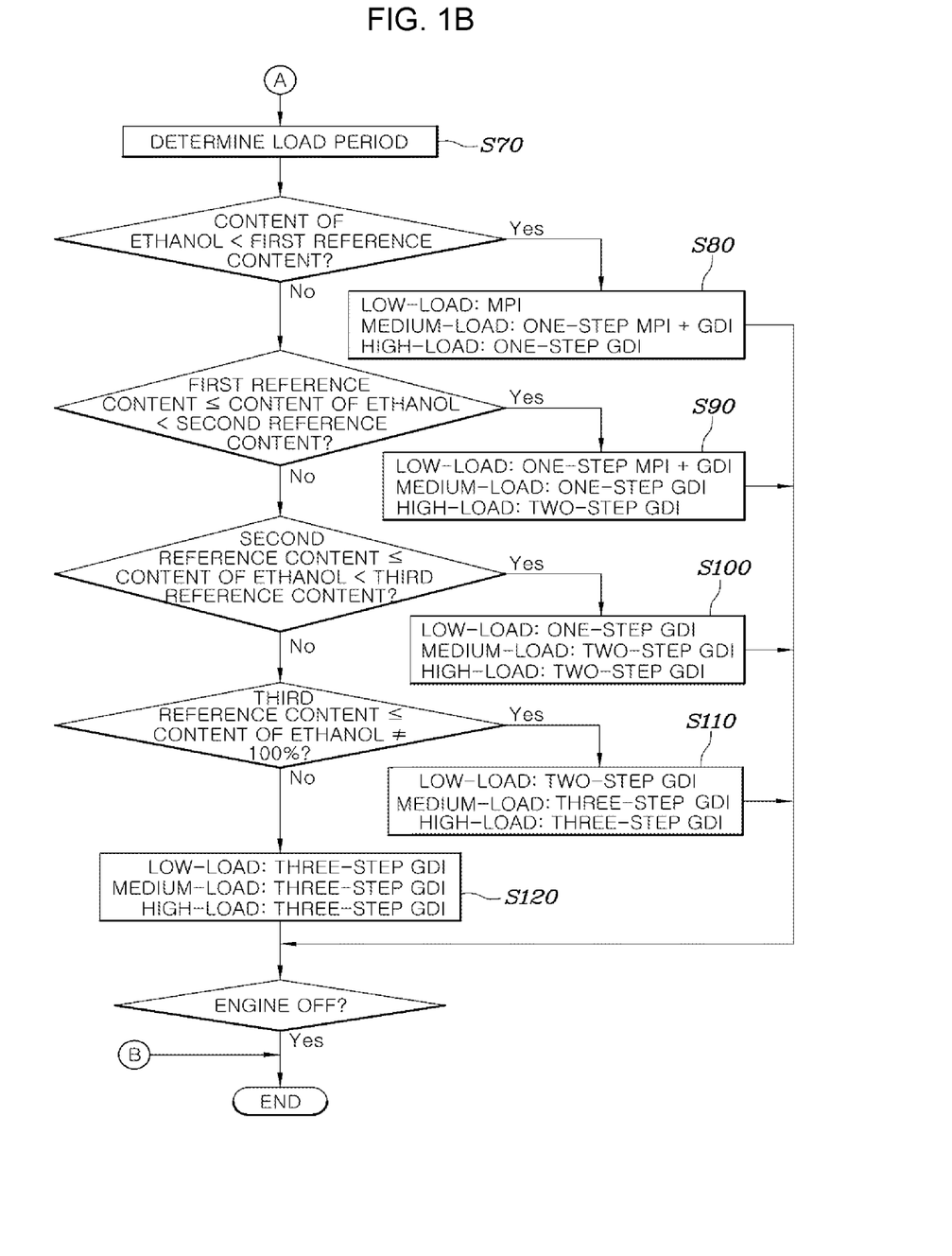

The present invention is described in detail with reference to FIGS. 1 to 2B. First, in a cold-starting determination step, a controller can determine whether a cold-starting condition is satisfied on the basis of an output value which may be obtained from a vehicle.

For example, in an ignition-on state before engine-cranking for starting an engine of a vehicle, the controller is configured to determine whether cold-starting of the vehicle is possible on the basis of output values such as cooling water temperature, engine oil temperature, external air temperature, and the altitude of the vehicle. The output values may be input to the controller by a water temperature sensor, an oil temperature sensor, an atmospheric temperature sensor, and an altimeter.

Next, in a detection step, when the controller is configured to determine that the cold-starting condition is satisfied, the content of ethanol in blended fuel of gasoline and ethanol may be detected.

For example, it is possible to sense the ratio, temperature, viscosity, and conductivity of ethanol in blended fuel through an ethanol sensor in a fuel tank, so that the content of ethanol in the fuel may be detected and input to the controller.

In a first injection control step, the controller can control the blended fuel to be injected selectively in one of a Multi-Point Injection (MPI) mode, an MPI & GDI mode combining MPI and Gasoline Direct Injection (GDI) modes, and a GDI mode in accordance with the content of ethanol in the blended fuel until the engine RPM reaches an early peak RPM in engine-cranking.

The early peak RPM may be determined as the engine RPM when engine RPM increases and reaches a peak at the early engine starting by engine-cranking.

Figure 2A:
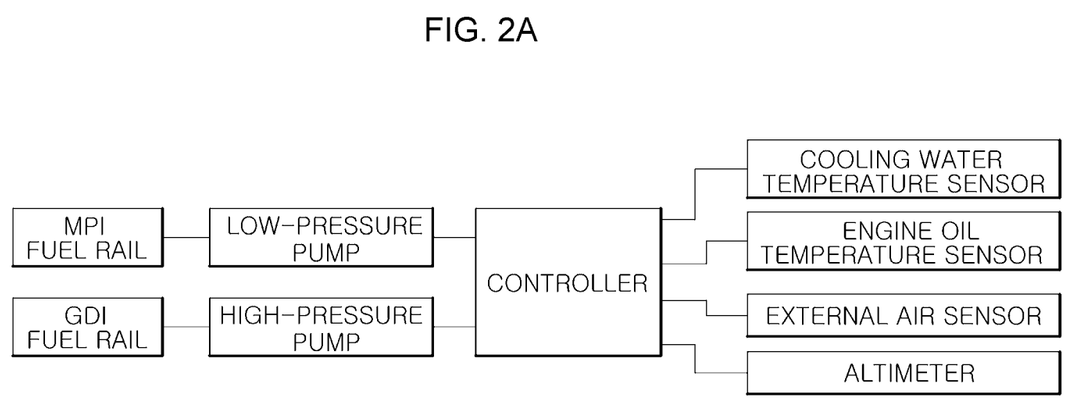
FIG. 2A and FIG. 2B are views conceptually showing a blended fuel injection control system according to an exemplary embodiment of the present invention.
Figure 2B:
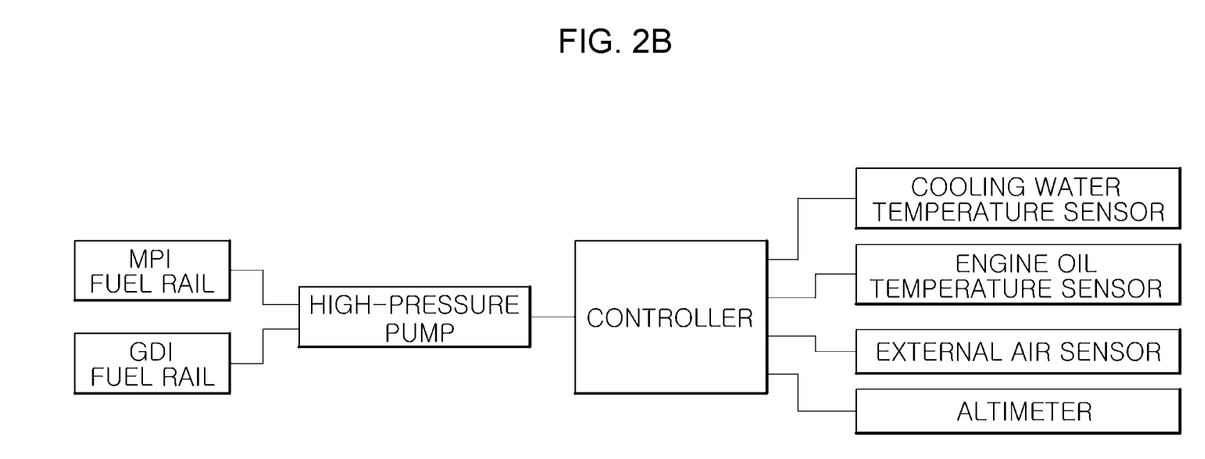

As shown in FIG. 2A, in the MPI & GDI, the MPI and GDI may be performed by operating a low-pressure pump in MPI and a high-pressure pump in GDI, but MPI and GDI may be simultaneously performed by operating a high-pressure pump, as shown in FIG. 2B.

The configuration for the first injection step will be described in more detail. Blended fuel may be injected in the MPI mode when the content of ethanol in the blended fuel is less than a first reference content.

That is, when the content of ethanol is less than 27.5%, the blended fuel is injected in the MPI mode.

When the content of ethanol in the blended fuel is the first reference content or more and less than a second reference content, the blended fuel may be injected in the MPI & GDI mode.

That is, when the content of ethanol is 27.5% or more and less than 70%, blended fuel is injected in a combination of the MPI mode and the GDI mode.

When the content of ethanol in the blended fuel is the second reference content or more, the blended fuel is injected in the GDI mode.

That is, when the content of ethanol is 70% or more, the blended fuel is injected in the GDI mode.

According to the present configuration, the combustion speed is improved by stable ignition in the GDI, so stability of combustion is improved. Accordingly, the ability to start an engine of a vehicle at low external air temperature or in a winter season is improved.

However, in normal driving, exhaust emission becomes worse in the GDI than the MPI, so fuel is injected in the MPI mode when the content of ethanol is low in cold-starting.

Accordingly, it is possible to improve the ability of starting an engine of a vehicle and minimize exhaust emission at low temperature by appropriately changing the ratio of the MPI and the GDI in accordance with the content of ethanol.

The present invention may further include a second injection control step that controls blended fuel to be injected selectively in one of the MPI mode, the MPI & GDI mode, and the GDI mode in accordance with load periods, which are determined by the relationship between the engine RPM and the engine torque, after the first injection control step.

That is, in the early engine starting by engine-cranking, fuel may be injected in an injection mode determined in accordance with an injection control plan according to the first injection control step, and after the engine starting, fuel may be injected in an injection mode determined in accordance with an injection control plan according to the second injection control step.

Figure 3A:
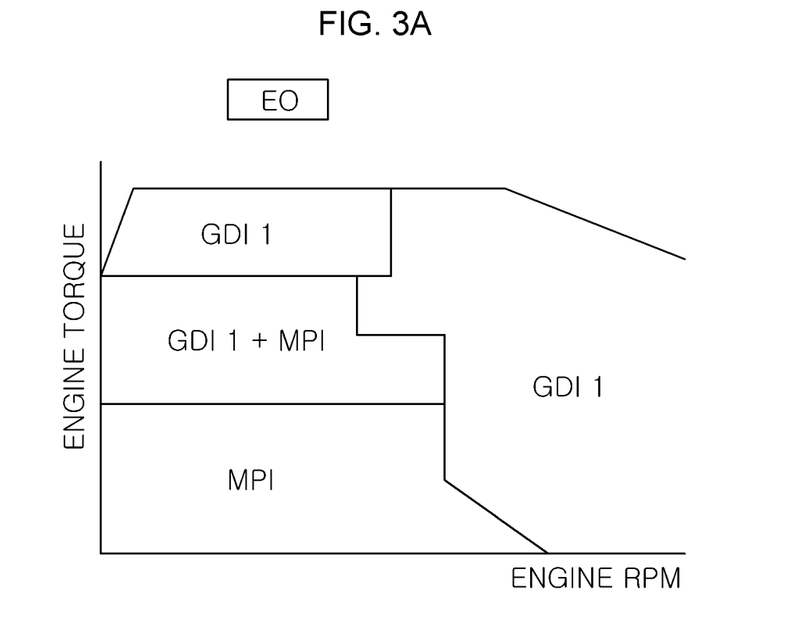
FIG. 3A, FIG. 3B, FIG. 3C, FIG. 3D and FIG. 3E are views showing injection modes that are determined in accordance with the content of ethanol and a load period after the early engine starting in an exemplary embodiment of the present invention.
Figure 3B:
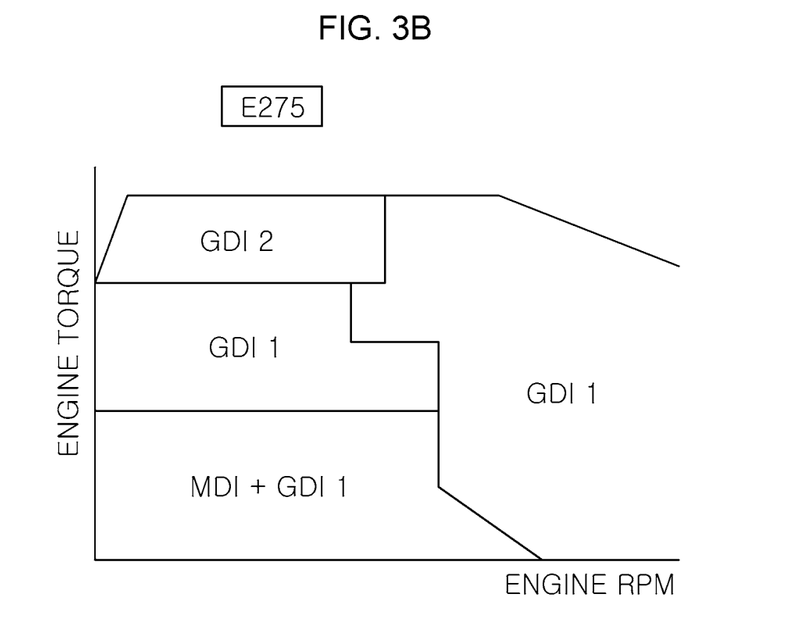

As an example of the second injection control step, as shown in FIG. 3A, when the content of ethanol is less than the first reference content, blended fuel may be injected in the MPI mode in a low-load period, may be injected in the MPI & GDI mode in the medium-load period, and may be injected in the GDI mode in a high-load period.

For example, when the content of ethanol is less than 27.5%, blended fuel may be injected in the MPI mode in the low-load period, may be injected in both of the MPI mode and the GDI mode in the medium-load period, and may be injected only in the GDI mode in the high-load period.

In the MPI & GDI mode combining the MPI mode and the GDI mode, the ratio of the fuel injection amount for the MPI and the fuel injection amount for the GDI may be determined in accordance with the load periods that are determined by the relationship between the engine RPM and the engine torque.

For example, in the period where the engine torque is relatively low in the medium-load period, the MPI ration is controlled to be higher than the GDI ratio and fuel may be injected, as compared with the period where the engine torque is relatively high.

The low-, medium-, and high-load periods may be determined in accordance with the magnitude of engine torque under a predetermined engine RPM. That is, the period with relatively low engine torque may be determined as the low-load period and the period with relatively high engine torque may be determined as the high-load period, which are applied to the following description As another example of the second injection control step, as shown in FIG. 3A, when the content of ethanol is the first reference content or more and less than the second reference content, blended fuel may be injected in the MPI & GDI mode in the low-load period and may be injected in the GDI mode in the medium-load period and the high-load period.

For example, when the content of ethanol is 27.5% and more and less than 70%, blended fuel may be injected in both of the MPI mode and the GDI mode in the low-load period and may be injected only in the GDI mode in medium-load period and the high-load period.

When the content of ethanol is the first reference content or more and less than the second reference content, GDI which is performed in the MPI & GDI mode and the GDI mode can inject fuel in one step or multiple steps.

For example, when the content of ethanol is the first reference content or more and less than the second reference content, GDI may be performed in one step in the low-load period and the medium-load period.

Furthermore, when the content of ethanol is the first reference content or more and less than the second reference content, GDI may be performed in two steps in the high-load period.

Figure 3C:
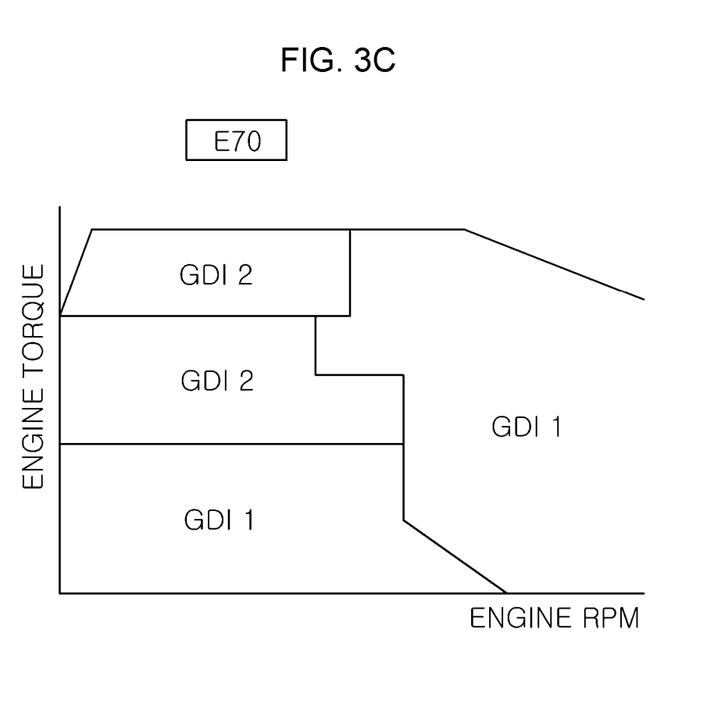

As another example of the second injection control step, as shown in FIG. 3C, when the content of ethanol is the second reference content or more, fuel may be injected in the GDI mode in all of the low-, medium-, and high-load periods.

Obviously, in the instant case, GDI which is performed in the GDI mode can inject fuel in one step or multiple steps.

The content of ethanol is divided in more detail. When the content of ethanol is the second reference content or more and less than a third reference content, GDI in the low-load period can performed in one step.

Furthermore, when the content of ethanol is the first reference content or more and less than the second reference content, GDI may be performed in two steps in the high-load period.

The third reference content may mean the content of ethanol is 85%.

Figure 3D:
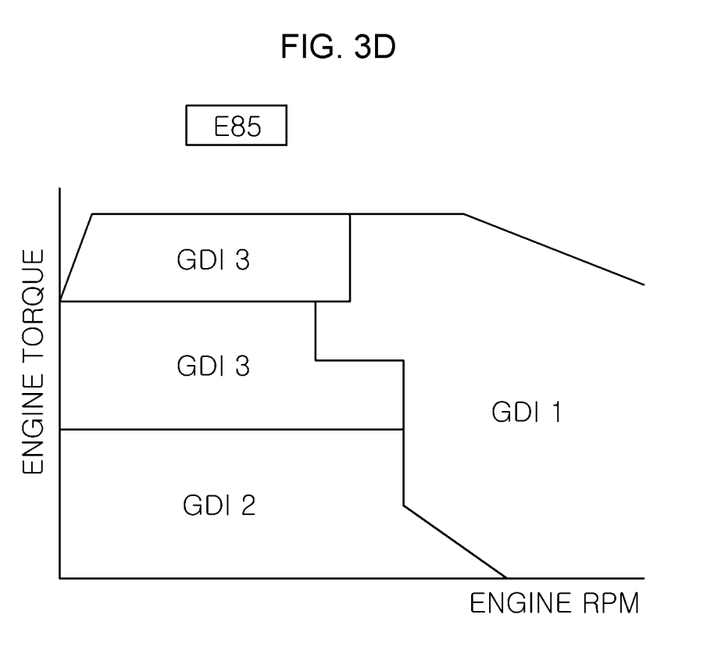

Furthermore, as shown in FIG. 3D, when the content of ethanol is the third reference content or more but less than 100%, GDI in the low-load period may be performed in two steps and GDI in the medium- and high-load periods may be performed in three steps.

Figure 3E:
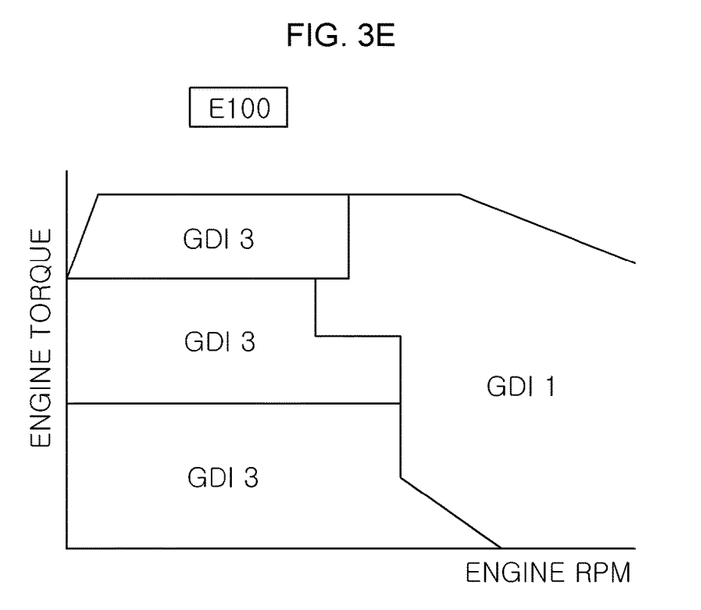

Furthermore, as shown in FIG. 3E, in the second injection control step, when the content of ethanol is 100%, GDI may be performed in three steps in all of the low-, medium-, and high-load periods.

Figure 4:
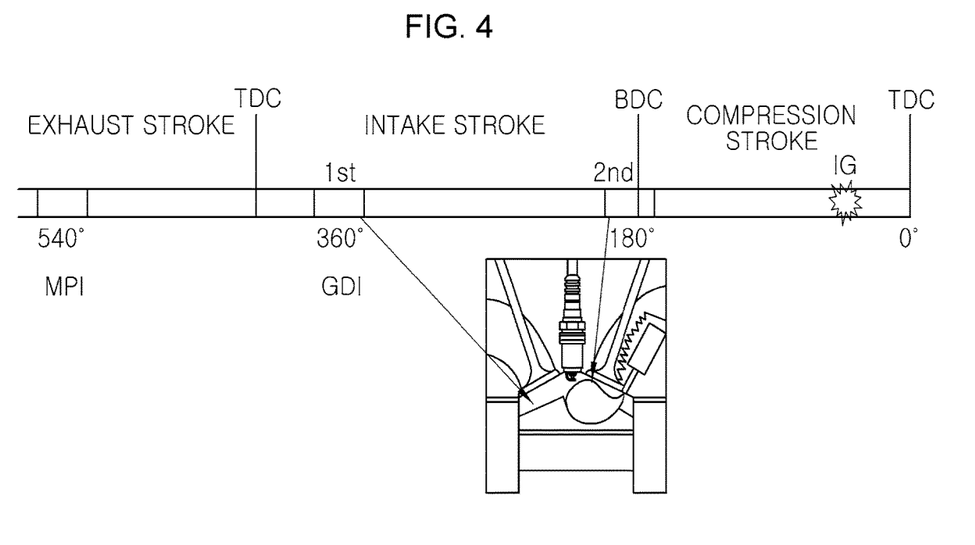
FIG. 4 is a view showing an injection time in MPI according to an exemplary embodiment of the present invention.

Referring to FIG. 4, in the second injection control step of the present invention, when MPI is performed, the fuel injection time may be advanced or retarded by a predetermined angle to inject fuel from the top dead center of a piston in an intake stroke, depending on the load periods determined by the relationship between the engine RPM and the engine torque.

The top dead center of a piston in an intake stroke may be a point where the piston has moved to the highest position in a process of entering the intake stroke from an exhaust stroke.

That is, when fuel is injected in the MPI mode, the fuel injection time may be advanced or retarded by about −200~200° such that fuel is injected with an intake valve closed or with the intake valve open in the exhaust stroke. It is possible to further improve the ability to starting an engine of a vehicle by simultaneously controlling the time of opening or closing the intake valve, using a continuously variable valve timing (CVVT) control system.

Figure 5A:
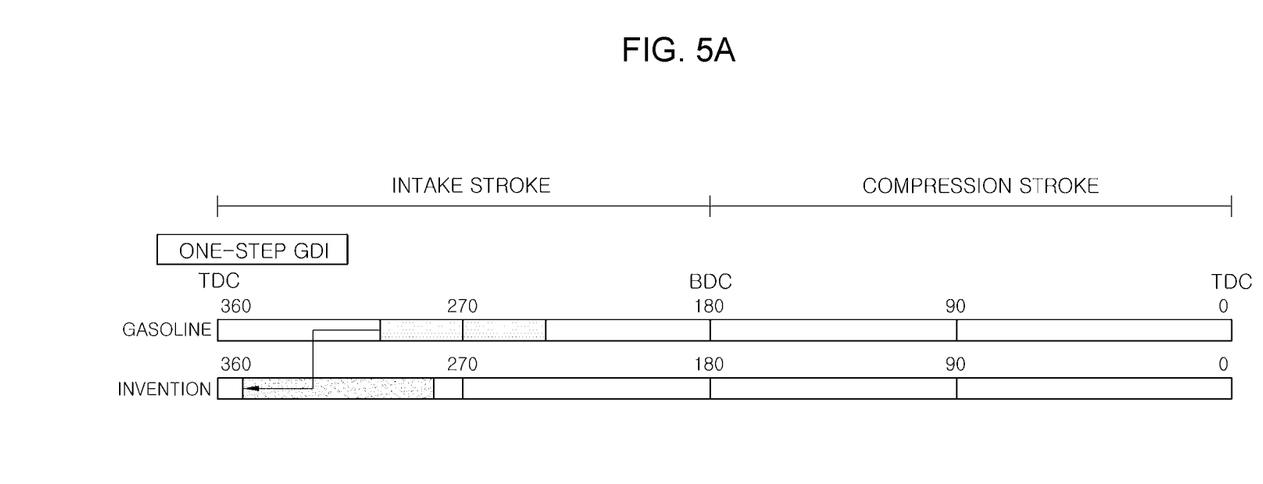
FIG. 5A, FIG. 5B and FIG. 5C are views showing an injection time in GDI according to an exemplary embodiment of the present invention.
Figure 5B:
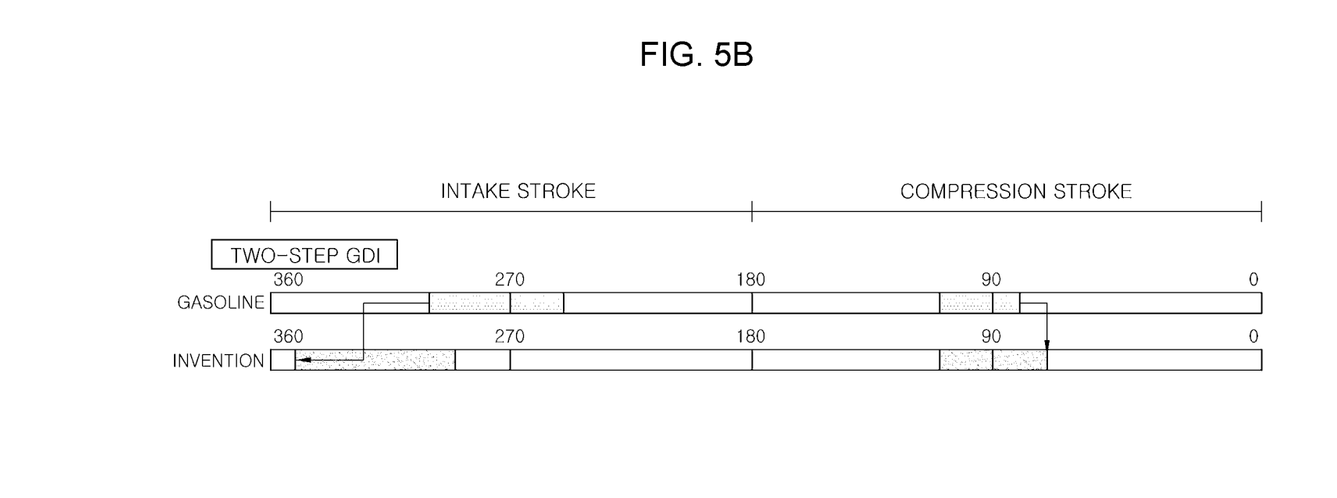
Figure 5C:
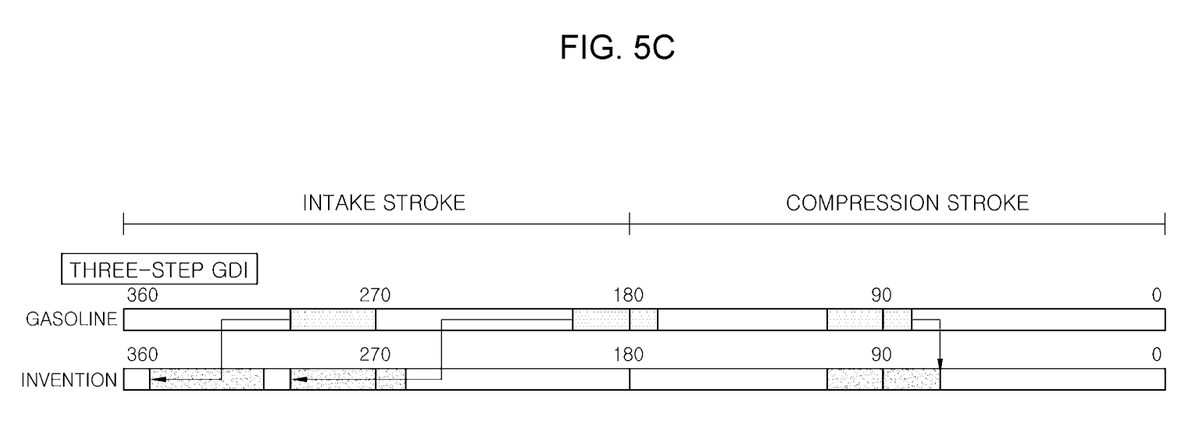

Referring to FIG. 5A to 5C, in one injection step shown in FIG. 5A in the GDI in the second injection control step of the present invention, it is possible to inject fuel during a predetermined angle within 90° in the retarded direction from the top dead center of a piston in an intake stroke.

For example, injection is controlled to be performed in the early stage of the intake stroke, which may be advanced about 10~120°, as compared with the injection time of gasoline not containing ethanol.

In two injection steps shown in FIG. 5B in the GDI, the first injection can inject fuel during a predetermined angle within a range of 90° in the retarded direction from the top dead center of a piston in an intake stroke and the second injection can inject fuel during a predetermined angle at the point of time corresponding to the middle point between the bottom dead center and the top dead center of the piston in a compression stroke.

For example, the first injection is controlled to inject fuel in the early stage of the intake stroke, which may be advanced about 1~120°, as compared with the injection time of gasoline not containing ethanol. However, since the second injection is performed after the first injection, the ending time of the first injection is advanced about 10~30°, as compared with the injection time of the one-step injection, so that the injection time is reduced.

Furthermore, the second injection of the two-step injection is controlled to inject fuel in the middle of a compression stroke, so that the injection ending time may be delayed about 10~30°, as compared with the injection ending time of gasoline not containing ethanol.

Furthermore, in three injection steps shown in FIG. 5C in the GDI, the first injection and the second injection can intermittently inject fuel during a predetermined angle within a range of 100° in the retarded direction from the top dead center of a piston in an intake step and the third injection can inject fuel during a predetermined angle around the middle point between the bottom dead center and the top dead center of the piston in a compression stroke.

For example, the first injection, as in the one-step and two-step injection, is controlled to inject fuel in the early stage of the intake stroke, which may be advanced about 10~120°, as compared with the injection time of gasoline not containing ethanol. However, since the second injection is performed after the first injection, the ending time of the first injection is advanced about 10~30°, as compared with the injection time of the two-step injection, so that the injection time is reduced.

Furthermore, the second injection in the three-step injection injects fuel in the intake stroke after the first injection, which may be advanced about 50~200°, as compared with the injection time of gasoline not containing ethanol.

Furthermore, the third injection of the three-step injection is controlled to inject fuel in the middle of a compression stroke, so that the injection ending time may be delayed about 10~30°, as compared with the injection ending time of gasoline not containing ethanol.

The entire process of controlling injection of blended fuel according to an exemplary embodiment of the present invention is described hereafter with reference to FIG. 1A and FIGS. 1B and 3A to 3E.

When an engine of a vehicle is started, in an ignition-on state before engine crank-in, when the vehicle satisfies a cold-starting condition is determined on the basis of detected values such as cooling water temperature, engine oil temperature, and external air temperature (S10).

When the cold-starting condition is satisfied, the content of ethanol in blended fuel is detected (S20).

As such, when the content of ethanol is less than 27% in engine-cranking, fuel is injected in the MPI mode (S30), when the content of ethanol is 27% or more and less than 70%, fuel is injected in both of the MPI mode and the GDI mode (S40), and when the content of ethanol is 70% or more, fuel is injected in the GDI mode (S50).

This fuel injection control is performed in the early engine starting and is continued until the engine RPM reaches the early peak RPM (S60).

When the engine RPM reaches the early peak RPM, load periods of the vehicle are determined on the basis of the relationship between the engine RPM and the engine torque (S70).

Next, the fuel injection mode is changed in accordance with the content of ethanol and the load period of the engine. When the content of ethanol is less than 27.5%, fuel is injected in the MPI mode in the low-load period, is injected in both of the MPI mode and the GDI mode in the medium-load period, and is injected in the GDI mode in the high-load period (S80).

When the content of ethanol is 27.5% or more and less than 70%, fuel is injected in both of the MPI mode and the GDI mode in the low-load period and is injected in the GDI mode in the medium-load period and the high-load period (S90).

When the content of ethanol is 70% or more and less than 85%, fuel is injected in one-step GDI in the low-load period and is injected in two-step GDI in the medium-load period and the high-load period (S100).

When the content of ethanol is 80% or more but less than 100%, fuel is injected in two-step GDI in the low-load period and is injected in three-step GDI in the medium-load period and the high-load period (S110).

Finally, when the content of ethanol is 100%, fuel is injected in three-step GDI in the low-, medium-, and high-load periods (S120).

As described above, according to an exemplary embodiment of the present invention, it is possible to improve the ability of starting an engine of a vehicle and minimize exhaust emission at low temperature by appropriately changing the ratio of the MPI and the GDI in accordance with the content of ethanol.

Furthermore, it is possible to minimize exhaust emission by appropriately changing the ratio of MPI and GDI to inject fuel in accordance with the content of ethanol and the load of a vehicle even while the vehicle is driven after cold-starting.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the claims appended hereto and their equivalents.

What is claimed is:

1. A blended fuel injection control method comprising:
   a cold-starting determination step of determining, by a controller, when a cold-starting condition is satisfied on a basis of output values that are configured to be obtained by the controller, wherein the output values are input to the controller by at least one of a water temperature sensor, an oil temperature sensor, an atmospheric temperature sensor, and an altimeter;
   a determination step of determining, by the controller, a content of ethanol in a blended fuel of gasoline and the ethanol when determining that the cold-starting condition is satisfied;
   a first injection control step of controlling, by the controller, the blended fuel to be injected selectively in one of a Multi-Point Injection (MPI) mode, an MPI & Gasoline Direct Injection (GDI) mode combining MPI and GDI modes, and a GDI mode in accordance with the content of the ethanol in the blended fuel until an engine revolution per minute (RPM) reaches a predetermined peak RPM as the engine RPM increases at an early engine staring by engine-cranking; and
   a second injection control step of controlling the blended fuel to be injected selectively in one of the MPI mode, the MPI & GDI mode, and the GDI mode in accordance with load periods including a low-load period, a medium-load period, and a high-load period, which are determined by a relationship between the engine RPM and an engine torque, after the first injection control step,
   wherein, in the second injection control step, when the content of the ethanol is a first reference content or more and less than a second reference content, GDI in the low-load period and the medium-load period performs one-step injection and the GDI in the high-load period performs two-step injection,
   wherein, in the one-step injection of the GDI mode, fuel is injected during a predetermined angle within a range of 90° in a retarded direction from a top dead center of a piston in an intake stroke; and
   wherein, in the two-step injection of the GDI mode, a first injection of fuel is performed for a predetermined angle within a range of 90° in the retarded direction from the top dead center of the piston in the intake stroke and a second injection of fuel is performed during a predetermined angle from a middle point between a bottom dead center and a top dead center of the piston in a compression stroke.

2. The method of claim 1, wherein the first injection control step includes:
   injecting the blended fuel in the MPI mode when the content of the ethanol is less than the first reference content,
   injecting the blended fuel in the MPI & GDI mode when the content of the ethanol is the first reference content or more and less than the second reference content, and
   injecting the blended fuel in the GDI mode when the content of the ethanol is the second reference content or more.

3. The method of claim 1, wherein, when the content of the ethanol is less than the first reference content, the second injection control step includes:
   injecting the blended fuel in the MPI mode in the low-load period, injecting the blended fuel in the MPI & GDI mode in the medium-load period, and injecting the blended fuel in the GDI mode in the high-load period.

4. The method of claim 1, wherein, when the content of the ethanol is the first reference content or more and less than the second reference content, the second injection control step includes:
   injecting the blended fuel in the MPI & GDI mode in the low-load period and injecting the blended fuel in the GDI mode in the medium-load period and the high-load period.

5. The method of claim 1, wherein, in the second injection control step, when the content of the ethanol is the second reference content or more, the blended fuel is injected in the GDI mode in the low-load period, the medium-load period, and the high-load period.

6. The method of claim 5, wherein, in the second injection control step, when the content of the ethanol is the second reference content or more and less than a third reference content, GDI in the low-load period performs the one-step injection and GDI in the medium-load period and the high-load period performs the two-step injection.

7. The method of claim 6, wherein, in the second injection control step, when the content of the ethanol is the third reference content or more but less than 100%, the GDI in the low-load period performs two-step injection and the GDI in the medium-load period and the high-load period performs three-step injection.

8. The method of claim 7,
   wherein, in the one-step injection of the GDI mode, fuel is injected during a predetermined angle within a range of 90° in a retarded direction from a top dead center of a piston in an intake stroke;
   wherein, in the two-step injection of the GDI mode, a first injection of fuel is performed for a predetermined angle within a range of 90° in the retarded direction from the top dead center of the piston in the intake stroke and a second injection of fuel is performed during a predetermined angle from a middle point between a bottom dead center and a top dead center of the piston in a compression stroke; and
   wherein, in the three-step injection of the GDI mode, the first injection and the second injection of fuel are intermittently performed during a predetermined angle within a range of 100° in the retarded direction from the top dead center of the piston in the intake stroke, and third injection injects fuel during a predetermined angle at the middle point between the bottom dead center and the top dead center of the piston in the compression stroke.

9. The method of claim 6, wherein, in the second injection control step, when the content of the ethanol is 100%, the GIN in the low-load period, the medium-load period, and the high-load period performs three-step injection.

10. The method of claim 9,
    wherein, in the one-step injection of the GDI mode, fuel is injected during a predetermined angle within a range of 90° in a retarded direction from a top dead center of a piston in an intake stroke;
    wherein, in the two-step injection of the GDI mode, a first injection of fuel is performed for a predetermined angle within a range of 90° in the retarded direction from the top dead center of the piston in the intake stroke and a second injection of fuel is performed during a predetermined angle from a middle point between a bottom dead center and a top dead center of the piston in a compression stroke; and
    wherein, in the three-step injection of the GDI mode, the first injection and the second injection of fuel are intermittently performed during a predetermined angle within a range of 100° in the retarded direction from the top dead center of the piston in the intake stroke, and third injection injects fuel during a predetermined angle at the middle point between the bottom dead center and the top dead center of the piston in the compression stroke.

11. The method of claim 1, wherein, in the MPI and GIN mode, a ratio of a fuel injection amount according to MPI and a fuel injection amount according to the GDI is determined in accordance with the load periods that are determined by the relationship between the engine RPM and the engine torque.

12. The method of claim 1, wherein, in MPI, a fuel injection time is advanced or retarded a predetermined angle from a top dead center of a piston in an early stage of an intake stroke, in accordance with the load periods that are determined by the relationship between the engine RPM and the engine torque.

13. The method of claim 1,
wherein, in the one-step injection of the GM mode, fuel is injected during a predetermined angle within a range of 90° in a retarded direction from a top dead center of a piston in an intake stroke;

wherein, in the two-step injection of the GDI mode, a first injection of fuel is performed for a predetermined angle within a range of 90° in the retarded direction from the top dead center of the piston in the intake stroke and a second injection of fuel is performed during a predetermined angle from a middle point between a bottom dead center and a top dead center of the piston in a compression stroke; and wherein, in three-step injection of the GDI mode, the first injection and the second injection of fuel are intermittently performed during a predetermined angle within a range of 100° in the retarded direction from the top dead center of the piston in the intake stroke, and third injection injects fuel during a predetermined angle at the middle point between the bottom dead center and the top dead center of the piston in the compression stroke.

\* \* \* \* \*